June 7, 1966 C. KOLN ETAL 3,255,401

PYROELECTRIC GENERATOR

Original Filed March 3, 1961

INVENTOR.
CAROL KOLM
PETER H. FOWLER
BY
Blair & Buckles

United States Patent Office 3,255,401
Patented June 7, 1966

3,255,401
PYROELECTRIC GENERATOR

Carol Koln, Bolton, and Peter H. Fowler, Watertown, Mass. (both % U.S. Sonics Corp., 63 Rogers St., Cambridge 42, Mass.)

Original application Mar. 3, 1961, Ser. No. 93,237. Divided and this application Sept. 1, 1964, Ser. No. 399,127
8 Claims. (Cl. 322—2)

This invention relates to a novel power source capable of direct conversion of heat into electricity. More particularly, it relates to an electrical generator incorporating pyroelectric transducers, which are subjected to a temperature cycling routine to develop charges of alternating polarity thereon. This application is a division of our copending application Serial No. 93,237, filed March 3, 1961, now U.S. Patent No. 3,198,969.

Our invention is of particular use in cases where power for conventional electromechanical generators is unavailable or the use of such generators is commercially or otherwise impractical. In many such cases there is a source of heat or, more accurately, a temperature differential occasioned by the presence of a heat source and a suitable heat sink capable of absorbing heat from the source. This condition permits the use of various types of "heat engines," some of which are capable of converting the temperature differential directly into electrical energy. However, prior to the present invention, these devices have been characterized by such deficiencies as large size, low efficiency of conversion of heat into electricity and excessive cost.

Accordingly, it is a principal object of our invention to provide an improved electrical generating system adapted to convert heat directly into a usable amount of electrical energy. For example, in some applications, it is desirable to use the electrical energy from the system to run wireless transmitters and receivers.

Another object of the invention is to provide a generating system of the above type characterized by light weight and relatively high conversion efficiency, thereby rendering it suitable for airborne and space applications.

A further object of the invention is to provide a generating system of the above type having a relatively low cost per unit of power capability.

Other objects of the invention will in part be obvious and will in part appear hereinafter.

The invention accordingly comprises the features of construction, combinations of elements and arrangements of parts which will be exemplified in the constructions hereinafter set forth and the scope of the invention will be indicated in the claims.

Figure 1:
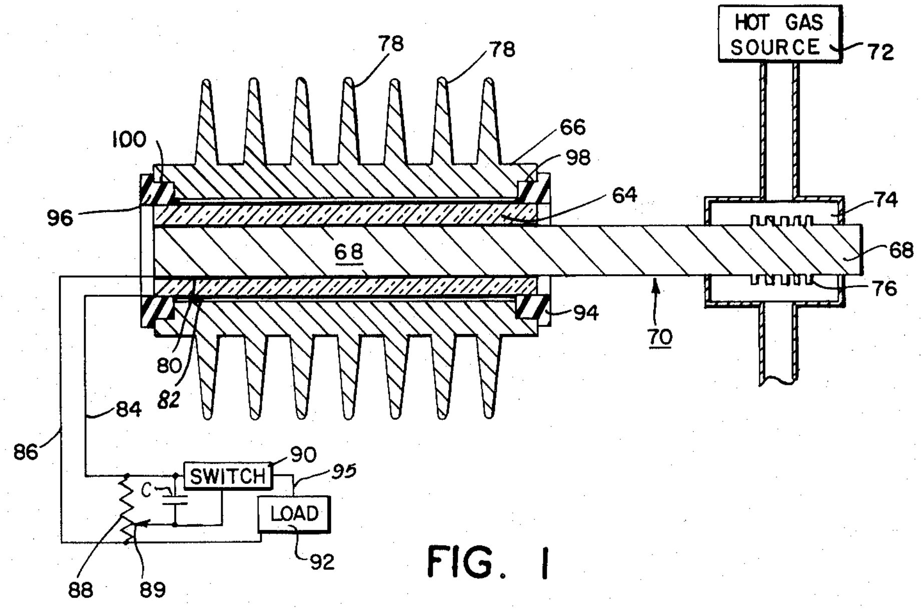
Figure 2:
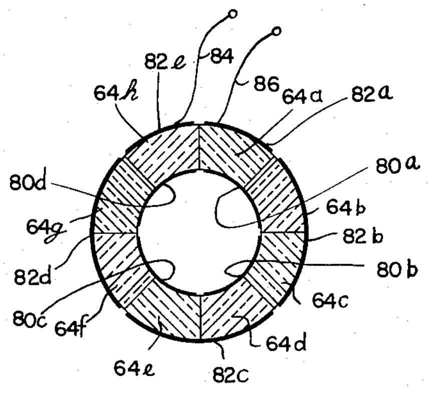

For a fuller understanding of the nature and objects of the invention, reference should be had to the following detailed description taken in connection with the accompanying drawing, in which:

FIGURE 1 is a longitudinal section of a generator incorporating the principles of our invention, with some of the elements represented schematically, and FIGURE 2 is a sectional view of a pyroelectric cylinder which may be used in the generator of FIGURE 1.

In general, our invention makes use of piezoelectric transducers, preferably of the ceramic type widely used as electroacoustical transducers. A transducer of this type has a strong remanent electrical polarization, and changes in dimension along the axis of polarization result in the development of a voltage between electrodes intersected by this axis. Since the dimensions of the transducer change with temperature, in common with most materials, a piezoelectric voltage is developed whenever the temperature of the transducer varies.

Also, there are strictly pyroelectric effects associated with transducers of this type. That is, a voltage is developed when the temperature is changed, even though changes in dimension are blocked. This is known as the "primary pyroelectric effect." The voltage produced by the piezoelectric action is termed the "secondary effect." There is also a "tertiary effect," the development of a voltage proportional to the rate of change of temperature or the temperature gradient.

All three pyroelectric effects develop voltages whose polarity depends on whether the temperature is increased or decreased. More specifically, when the temperature is increasing, with heat flow in the direction of the polarization, the voltages developed by all three effects are of the same polarity. We have made use of the pyroelectric effects by cyclically exposing the transducers to the elevated temperature of a heat source and then to the lower temperature of a heat sink. The voltages developed between the transducer electrodes are applied to the electrical load which is to consume the generated power.

In FIGURE 1 we have illustrated a generator embodying our invention in which a pyroelectric cylinder 64 is concentric with an outer heat sink generally indicated at 66, as well as an inwardly disposed shaft 68 of a heat source generally indicated at 70. In addition to the shaft 68, the heat source 70 includes a hot gas source 72, which projects hot gases into an enclosure 74 surrounding the lower end 68*a* of the shaft 68. Fins 76 aid in transferring heat from the gas to the shaft 68. The shaft, which is of a material having a high heat conductivity, in turn conducts the heat to the cylinder 64.

The cylinder, in absorbing heat from the shaft 68, undergoes an increase in temperature, with a resulting radial expansion away from the shaft until it engages the heat sink 66. The latter conducts heat away from the cylinder and disposes of it with the aid of fins 78. The cylinder 64 then cools and returns to the shaft 68, whereupon the cycle is again repeated.

More specifically, the cylinder 64, which is of a pyroelectric material, has inner and outer electrodes 80 and 82, preferably taking the form of highly reflective silver coatings to minimize transfer of heat into and out of the cylinder by radiation. The material of cylinder 64 is any one of a variety of well known ferroelectric ceramic materials having piezoelectric properties. Examples of such materials are lead zirconate (lead titanate, barium titanate, calcium titanate, and various combinations of these. Leads 84 and 86 connect the electrodes 82 and 80 to the ends of a potentiometer 88. The tap 89 of the potentiometer is connected to the control electrode of a switch 90, which is in series with a load 92 across the leads 84 and 86. A capacitor C is connected between the tap 89 and the lead 84. The switch 90 may take the form of a thyratron or a silicon controlled rectifier. Thus, once the voltage at the control electrode reaches a "firing potential," the switch conducts and remains in that condition until the voltage of the source switched thereby drops below a certain minimum level.

During operation, the cylinder 64 is centered with respect to the shaft 68 and heat sink 66 by a pair of rings 94 and 96 disposed between the cylinder 64 and shoulders 98 and 100 on the heat sink. The rings 94 and 96 are of highly resilient material such as silicone rubber, capable of withstanding the temperature to which the cylinder 64 is subjected.

In FIGURE 1, the relative dimensions have been exaggerated for the sake of clarity. In practice, the cylinder 64 may have a thickness of 50 mils, a length of several inches and a radius of the same order of magnitude. When the cylinder is contracted against the shaft 68, the spacing between the outer electrode 82 and the heat sink 66 may be of the order of 50 mils.

In considering operation of the generator of FIGURE 1, assume that a temperature of the cylinder 64, slightly greater than that of the heat sink 66, corresponds to a shrink-fit of the cylinder on the shaft 68. Conversely, a cylinder temperature slightly less than that of the shaft 68 corresponds to a similar fit between the cylinder and the heat sink. If, at a low temperature, the cylinder 64 is suddenly drawn into contact with the shaft 68, conduction of heat from the shaft to the cylinder will result in a rapid temperature rise in the latter. We may assume that the polarization in the cylinder 64 is such that the primary and tertiary pyroelectric effect accompanying the temperature rise cause the lead 84 to become positive with respect to the lead 86.

With the extreme thinness of the cylinder, the temperature rise is very rapid, so that the combined wave form of the primary and tertiary voltages is similar to a fairly sharp pulse. This pulse is readily passed by the capacitor C to the tap 89 and control electrode of the switch 90. The switch is rendered conducting, thereby connecting the load 92 to the lead 84. The load 92 has an impedance which is substantially less than the impedance of the cylinder 64 as defined below, and, therefore, the series combination of the switch 90 and load 92 acts essentially as a short circuit across the electrodes 80 and 82.

The short circuiting of a pyroelectric transducer greatly retards the change in dimension thereof resulting from temperature changes, and, thus, by the time the cylinder 64 has developed sufficient internal stresses to recover from its shrink-fit and begin to expand away from the shaft 68, it has reached a temperature almost equal to that of the shaft. This temperature, as pointed out above, is great enough to provide expansion all the way to the heat sink 66 and, in addition, effect a compression fit against the heat sink. The energy from the first and third pyroelectric effects has by now been dissipated in the load 92, and the switch 90 has accordingly opened to disconnect the load from the lead 84.

With the load 92 disconnected, the cylinder 64 expands rapidly and the secondary pyroelectric effect (piezoelectric effect) comes into play. This voltage is ultimately substantially greater than the primary and tertiary voltages, but its rate of increase is materially less, and, therefore, it is not bypassed to the tap 89 by the capacitor C. Thus, the voltage at the tap 89 depends on the setting of the tap as well as the voltages at the lead 84 with respect to ground. The tap 89 is set so that its voltage will reach the firing level of the switch 90 just before the cylinder 64 contacts the heat sink 66. At this point the switch once again conducts, to discharge the secondary energy into the load 92; the switch then opens, just as contact is made between the cylinder and heat sink.

Then the reverse process begins, except that this time the polarity of the primary and secondary voltages is reversed. The switch 90 conducts initially to help delay contraction of the cylinder 64 and then shuts off to permit rapid contraction thereof. Just prior to contact with the shaft 90, the switch is turned on to deliver secondary energy to the lead 92.

The expansion and contraction of the cylinder 64 thus continues indefinitely. The rate at which this occurs can be quite rapid. In fact, a rate of 40,000 cycles per second may be desirable for a unit having the above dimensions. By suitable choice of radius, this may be made to correspond to the natural frequency of the cylinder 64 in the radial mode, and the resulting resonance aids in effecting the desired motion.

The impedance of the cylinder 64 may be roughly defined as the capacitive reactance at the frequency of operation. As pointed out above, the impedance of the load 92 should be substantially less than the impedance of the cylinder at the effective frequency of the primary-tertiary voltage spike. More importantly, it should also be substantially less at the cyclic operating rate of the generator. This will insure essentially complete discharge of the piezoelectric energy to the load 92.

The impedance of the load 92 should, of course, be substantially greater than that of the switch 90 when the latter is conducting, so that substantially all of the power developed in the cylinder 64 is dissipated in the load.

In many cases, the cylinder 64 will be so thin that the resulting high capacitance thereof will provide a fairly low impedance. It may then be difficult to provide a load impedance which is substantially lower than the impedance of the cylinder. In such cases, one may resort to the configuration of FIGURE 2, in which the cylinder 64 is schematically divided into a series of arcuate segments 64*a*–64*h*. These segments may again be radially polarized, but with polarization in the opposite direction in adjacent segments. Thus, in the segment 64*a*, the polarization may be in the outward direction, and, in segments 64*b* and 64*h*, it will then be inward. The electrodes 80 and 82 are also segmented, with an inner electrode segment 80*a* covering the cylinder segments 64*a* and 64*b*, an overlapping outer segment 82*b* on the segments 64*b* and 64*c*, a further overlapping segment 80*b* and so on around the cylinder 64.

Thus, it will be seen that between the leads 84 and 86, connected to the outer electrode segments 82*e* and 82*a*, there is a capacitance comprising the capacitance of the individual segments in series. Furthermore, the voltage developed between the electrodes 82*a* and 80*a* adds to the voltage developed between the segments 80*a* and 82*b*, and so on around the cylinder. The increase in output voltage is offset by the decrease in capacitance, so that the total power developed by the cylinder 64 is unchanged. In the illustrated embodiment, the composite capacitor is eight times as thick as the cylinder 64 of FIGURE 1, and, furthermore, the effective area of each segment is one-eighth the area of the capacitor in FIGURE 1. Accordingly, the capacitance is reduced by a factor of 1/64.

It will be appreciated that other circuit elements than the ones specifically shown in FIGURE 1 can be used in accomplishing the functions set forth above. For example, a capacitor (not shown) connected between the lead 84 and load 92 may be used together with, or in place of, the capacitor C.

Moreover, different modes of operation are within the contemplation of our invention. Thus, the use of a switch may be dispensed with and the cylinder 64 connected directly to the load 92. However, in that case care must be taken in selecting the various parameters affecting operation, or the cylinder may come to an equilibrium position between the shaft 68 and heat sink 66, with a complete cessation of operation. Also, the constant connection to the load will slow down operation somewhat, with a correspondingly reduced power output.

It will be apparent that two important advantages of the system shown in FIGURE 1 are the absence of wear-producing motion and the omission of sources of motion external to the pyroelectric transducer.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. An electrical generating system comprising, in combination, a pyroelectric transducer having the form of a shell, said transducer having a pair of electrodes and being capable of developing a voltage between said electrodes in response to changes in its temperature, a heat source disposed within said shell and conforming to a substantial portion of the inner surface thereof when at a first temperature, a heat sink disposed adjacent an outer surface of said shell opposite said inner surface and substantially conforming to said outer surface when at a second temperature greater than said first temperature, whereby said shell cyclically expands and contracts to alternately absorb heat from said source and transfer it to said sink.

2. The combination defined in claim 1 including an electrical load and means connecting said load between said electrodes.

3. The combination defined in claim 2 including means for connecting said load across said electrodes when said shell contacts said source and said sink, disconnecting said load from said electrodes during a substantial portion of the interval after said shell loses contact with said source and said sink and before it again contacts one of them and connecting said load to said electrode immediately prior to contact between said shell and said source and sink.

4. The combination defined in claim 2 in which the impedance of said load is substantially less than the impedance of said shell.

5. The combination defined in claim 1 in which the surfaces of said shell facing said source and said sink and the surfaces of said source and sink facing said shell are of a highly reflective material.

6. An electrical generating system comprising, in combination, a pyroelectric transducer having a pair of electrodes, said transducer being capable of undergoing changes in dimension and developing a voltage between said electrodes in response to changes in its temperature, a heat source and a heat sink, said transducer being arranged so that its dimensional characteristics with respect to temperature position it in relatively close heat exchange relationship with said source when at a first temperature and relatively close heat exchange relationship with said sink when at a second temperature greater than said first temperature, said first temperature being at least as great as the temperature of said sink and said second temperature being no greater than the temperature of said source, whereby said transducer cyclically comes into close heat exchange relationship with said source and said sink.

7. The combination defined in claim 6 including an electrical load and means connecting said load to said electrodes.

8. The combination defined in claim 7 including means for connecting said load to said electrodes when said transducer is in positions corresponding to close heat exchange relationship with said source and sink, thereby to retard changes in dimension of said transducer, disconnecting said load during substantial portions of the intervals when said transducer is between said positions and connecting said load to said electrodes immediately prior to arrival of said transducer at said positions.

References Cited by the Examiner

UNITED STATES PATENTS 2,838,723 6/1958 Crownouer ---------- 310—9.1

LLOYD McCOLLUM, *Primary Examiner.*

A. H. TISCHER, *Assistant Examiner.*